US005846576A

United States Patent [19]

Braungardt et al.

[11] Patent Number: 5,846,576

[45] Date of Patent: Dec. 8, 1998

[54] APPARATUS FOR THE PRODUCTION OF SHAPED BRICKS

[75] Inventors: Rudolf Braungardt, Lengenfeld; Erwin Schmucker, Schelklingen, both of Germany

[73] Assignee: Kobra Formen- und Anlagen bau GmbH, Lengenfeld, Germany

[21] Appl. No.: 677,421

[22] Filed: Jul. 9, 1996

[30] Foreign Application Priority Data

Jul. 12, 1995 [DE] Germany ........................ 195 25 324.8

[51] Int. Cl.[6] ............................ B29C 33/44; B29C 43/50

[52] U.S. Cl. .......................... 425/253; 264/319; 264/334; 425/413; 425/414; 425/421; 425/422; 425/424; 425/432; 425/443; 425/468

[58] Field of Search .................................... 425/413, 414, 425/421, 422, 441, 443, 444, 357, 358, 468, 424, 432, 434, 253; 264/334, 319

[56] References Cited

U.S. PATENT DOCUMENTS

| | | | |
|---|---|---|---|
| 3,210,450 | 10/1965 | Bratton | 425/414 |
| 3,279,021 | 10/1966 | Pratt et al. | 425/414 |
| 3,379,120 | 4/1968 | Fogle | 425/468 |
| 3,744,950 | 7/1973 | Courtois | 425/414 |
| 4,456,449 | 6/1984 | Schubert et al. | 425/414 |
| 5,653,934 | 8/1997 | Brun, Jr. et al. | 425/441 |

*Primary Examiner*—Patrick Ryan
*Assistant Examiner*—Joseph Leyson
*Attorney, Agent, or Firm*—Edmund M. Jaskiewicz

[57] ABSTRACT

The mold for the production of concrete shaped bricks has several mold cavities, which are filled with free-flowing concrete. To produce recesses in the interior or on the outer sides of the shaped brick, to each mold cavity there correspond one or more mold cores which penetrate a wiping plate that lies below the mold and project from the bottom into the mold cavities. To demold the shaped brick, the mold cores that are arranged on a core support plate are run out from the mold cavities by a vertical movement relative to the mold and to the wiping plate to the upper limit of the wiping plate, and then the unit that consists of the wiping plate and core support plate is run out in the horizontal direction from the area of the mold.

8 Claims, 15 Drawing Sheets

APPARATUS FOR THE PRODUCTION OF SHAPED BRICKS

FIELD OF THE INVENTION

The invention relates to the production of shaped bricks formed from a free-flowing concrete, more particularly, to an apparatus and process for the production of such bricks having a mold and one or more mold cavities and a corresponding number of mold cores for producing openings through the brick or recesses on the outer side of the brick.

BACKGROUND OF THE INVENTION

In the production of hollow blocks or bricks, it has been known to position one or more cores each with a rectangular cross-section in the mold cavities of a multiple mold. The tops of the cores are interconnected to each other by a core holder that extends above the mold cavities. In order to remove the hollow block from the mold, the cores which have been provided with a contour or shape are removed together with the mold upwardly from the finished shaped brick. In such a known process, the core holder or support that has been positioned on the top surface of the shaped brick will leave behind an interrupted, uneven surface which means that bricks with such surfaces cannot be used for many purposes, such as, for example, paving bricks. Another disadvantage is that the recesses in the shaped brick can only be formed from above and because of the interruptions to the surface formed by the core holders, the shaped brick does not have any smooth outer surface.

SUMMARY OF THE INVENTION

It is the principal object of the present invention to provide a novel and improved apparatus and process for the production of shaped bricks.

It is another object of the present invention to provide such a process and apparatus which makes possible an efficient and highly automated series production of high-quality shaped bricks with varied forms of recesses in the interior and on the outside of the shaped brick.

According to one aspect of the present invention, an apparatus for the production of shaped bricks from a mold having one or more cavities may comprise a structure or means for supporting mold cores which correspond in numbers to the cavities within a mold disposed above the mold core support. There is a wiping plate which has a plurality of openings therein through which the mold cores protrude. Means are provided fore moving the wiping plate vertically with respect to the mold cores to a plane defined by the end of the cores. Further means are provided for moving the wiping plate together with the mold supporting means horizontally from the area of the mold.

Modifications to the apparatus may provide for moving of the wiping plate vertically upwardly with respect to the mold core or moving the mold cores vertically downwardly with respect to the wiping plate.

Another modification of the apparatus comprises a box having a bottom surface resting on a vibrating table of the apparatus and the core supporting means are mounted for vertical movement within the box. The wiping plate thus defines an upper surface of the box.

In another modification, structure is provided for moving the core supporting plate vertically downwardly with respect to the wiping plate and the mold. The wiping plate together with the core supporting means is then initially moved in a horizontal direction and then moved in a substantially vertical direction, which may be at a slope, relative to the mold.

A process for the production of shaped bricks according to the present invention may comprise the steps of introducing a free-flowing concrete into a mold which has one or more mold cavities and positioning mold cores in the mold cavities for forming recesses in the bricks. After the bricks have been molded, a wiping plate which is penetrated by the cores together with the mold is moved in the vertical direction with respect to the mold cores. The wiping plate together with the mold cores is then moved horizontally away from the mold.

A relative vertical movement between the wiping plate and the mold cores may comprise either movement of the wiping plate vertically upwardly or movement of the mold cores vertically downwardly.

The results and advantages that are achieved with the present invention are that recesses of any type can be made not only in the center and through the bricks but also on all of the outer surfaces of the shaped brick. Such recesses can thus pass completely through a brick or be in the form of blind holes which may have different shapes. Configurations that do not extend parallel to the mold wall or are formed in a graduated manner are also possible. Because of the fact that the mold cores do not extend horizontally as is the common practice but rather vertically downwardly, better use of the mold is possible since the cores are not positioned between the mold walls but outside of the mold. A further advantage is because of the wiping process during removal of the mold from the brick a clean and smooth surface of the shaped brick is obtained. No concrete residue will be built up on the cores from the wiping plate.

BRIEF DESCRIPTION OF THE DRAWINGS

Other objects and advantages of the present invention will be apparent upon reference to the accompanying description when taken in conjunction of the following drawings, which are exemplary, wherein.

DESCRIPTION OF THE PREFERRED EMBODIMENTS

Figure 1:
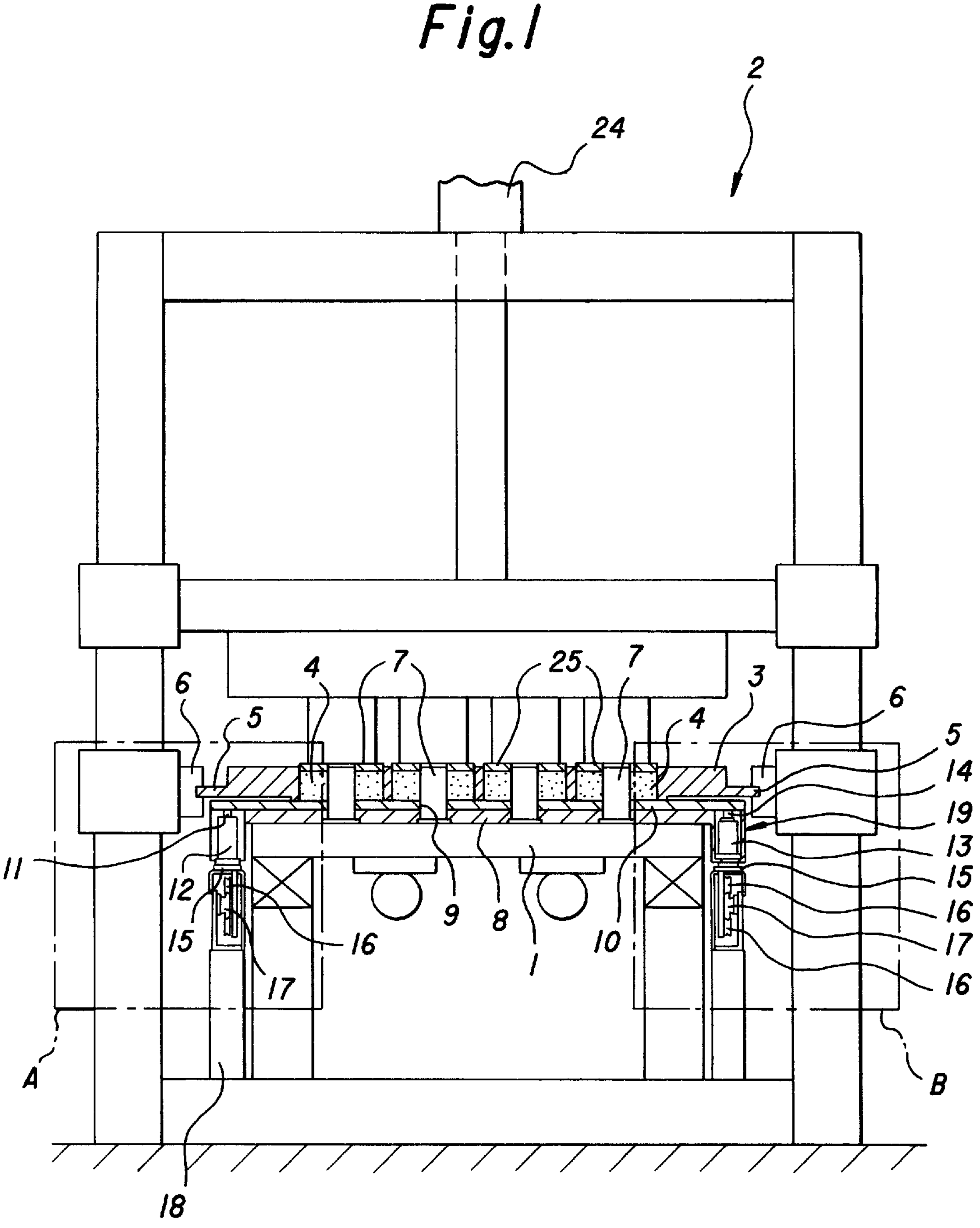
FIG. 1 is a front elevational view of the molding machine according to the present invention partially cut away and showing the mold core extending into the mold recesses.

Proceeding next to the drawings wherein like reference symbols indicate the same parts throughout the various views a specific embodiment and modification of the present invention will be described in detail.

A mold 3 with several mold cavities 4 is placed on a vibrating table1 of a molding machine 2. Mold 3 is demountably attached with lateral projections 5 to vertically movable supports 6 of molding machine 2; said supports can be driven by piston-cylinder units, not shown. Mold cores 7, which are attached to a core support plate 8 that rests on vibrating table 1, project from the bottom toward the top into mold cavities 4. Mold cores 7 penetrate holes 9 of a wiping plate 10, which rests the top side of core support plate 8 and covers the lower side of mold 3 downward. On the transverse sides of rectangular wiping plate 10, two piston rods 11 each of piston-cylinder units 12 are attached, which are used in the vertical raising and lowering of wiping plate 10 (left side of FIG. 1).

Figure 2:
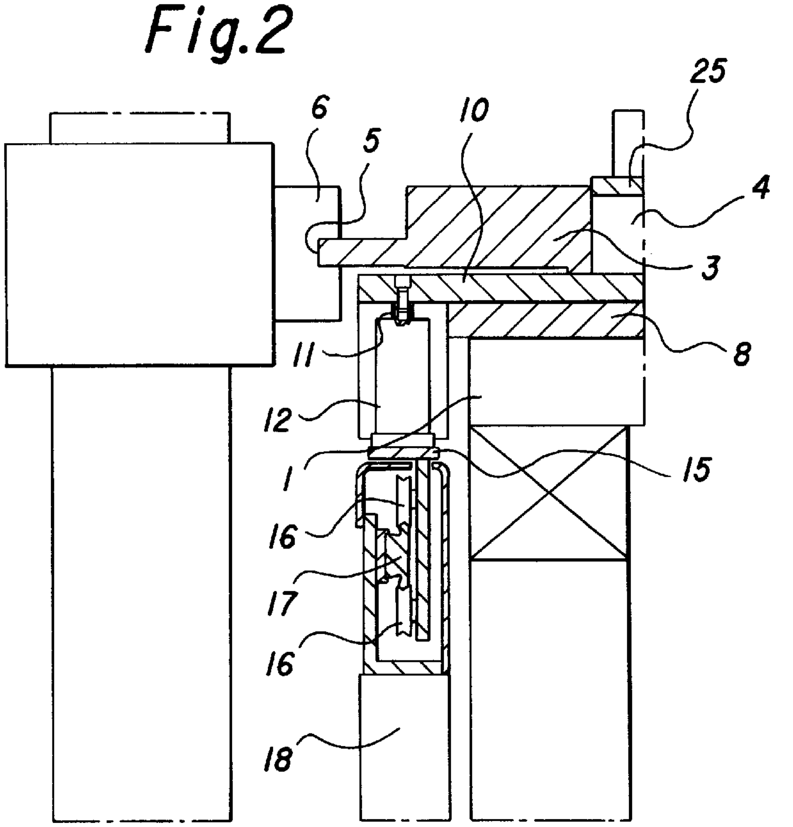
FIG. 2 is an enlarged view of detail A in FIG. 1.
Figure 3:
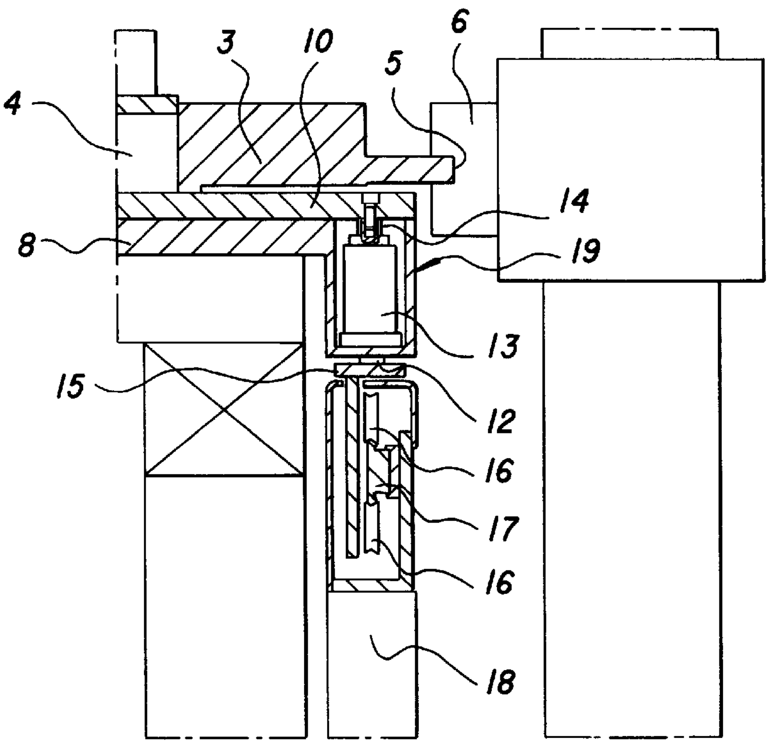
FIG. 3 is an enlarged view of detail B in FIG. 1.

The right side of FIG. 1 shows the connection of wiping plate 10 to core support plate 8 by stepped cylinders 13, which are attached to core support plate 8 and whose pistons 14 also clamp at the transverse sides of wiping plate 10. In the sectional view on the right side of FIG. 1, stepped cylinders 13 lie behind piston-cylinder units 12, not shown, which can be seen on the left side of FIG. 1. Vertical movement of core support plate 8 relative to wiping plate 10 is made possible by stepped cylinder 13. In FIG. 2 and 3, the arrangement of piston-cylinder units 12 and stepped cylinder 13 is depicted in enlarged form as details A and B of FIG. 1.

Figure 5:
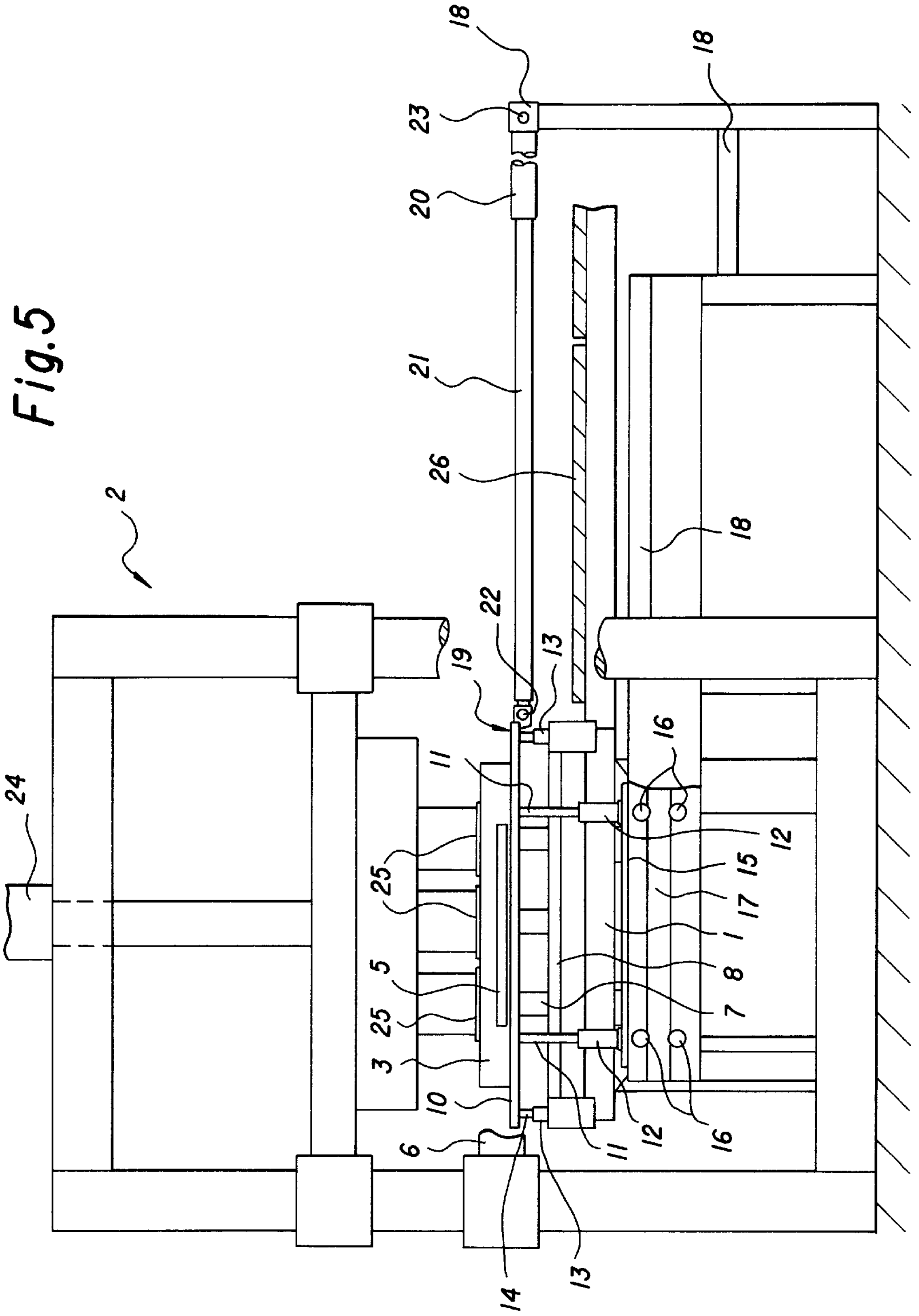
FIG. 5 is a side elevational view of the molding machine as shown in FIGS. 1 and 4.

Piston-cylinder units 12 are connected to one another by supports 15, which have rollers 16 on their lower sides and run on horizontal rails 17 of a frame 18 of molding machine 2. In this way, unit 19, which consists of wiping plate 10, core support plate 8, piston-cylinder units 12, and stepped cylinders 13, can be moved in the horizontal direction relative to mold 3. The driving of unit 19 is done by a hydraulic cylinder 20, whose piston rod 21 is attached to wiping plate 10 (FIG. 5). To offset the vertical movement of wiping plate 10, the connection between piston rod 21 and wiping plate 10, on the one hand, and hydraulic cylinder 20 and frame 18, on the other, is formed by rotatable connections 22 and 23.

Pressure plates 25, which are driven by a piston-cylinder unit 24, rest on filled mold cavities 4, and are vertically movable in a known way, correspond to mold cavities 4.

Figure 4:
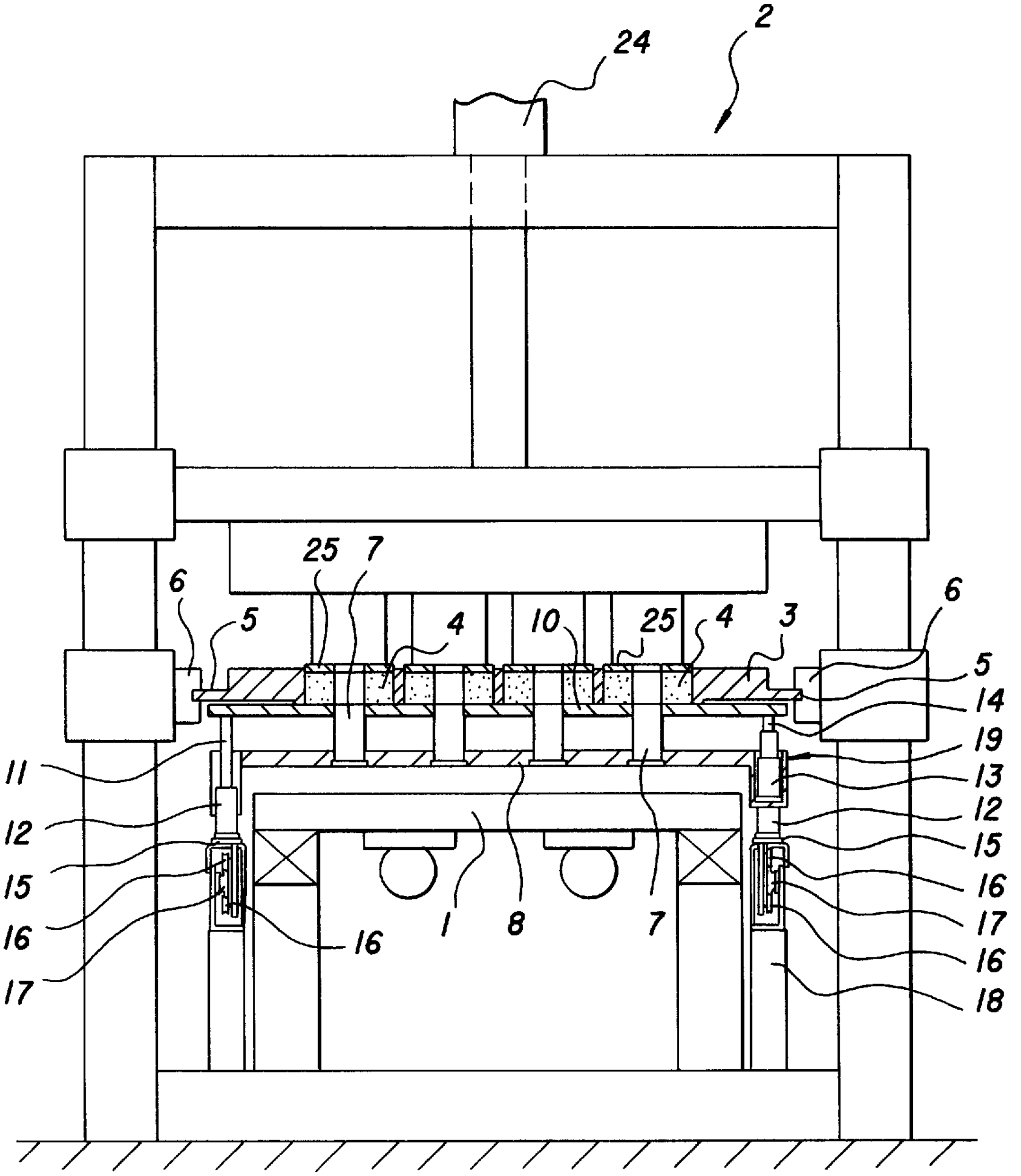
FIG. 4 is a front elevational view similar to that of FIG. 1 but showing the mold raised with respect to the mold cores.

The operation of the molding machine of the invention is as follows:

Mold cavities 4 of mold 3, which is placed by vertically movable and drivable supports 6 with wiping plate 10 and core support plate 8 on vibrating table 1, are filled with concrete and vibrated. After the filling and vibrating processes, mold 3 is raised by drivable supports 6 and pressure plates 25 are raised by piston-cylinder unit 24 (FIG. 4). At the same time, wiping plate 10 is moved upward by actuation of piston-cylinder units 12. Core support plate 8 is initially kept in its lower position by actuation of stepped cylinder 13, so that wiping plate 10 moves upward relative to core support plate 8 and mold 3 is removed from mold cores 7. The vertical movement upward and the relative movement between mold 3 and mold cores 7 are completed when the top side of mold core 7 lies on the same plane as the top side of wiping plate 10 and core support plate 8 rests with a vertical gap above vibrating table 1 (FIG. 4 and 5).

Figure 6:
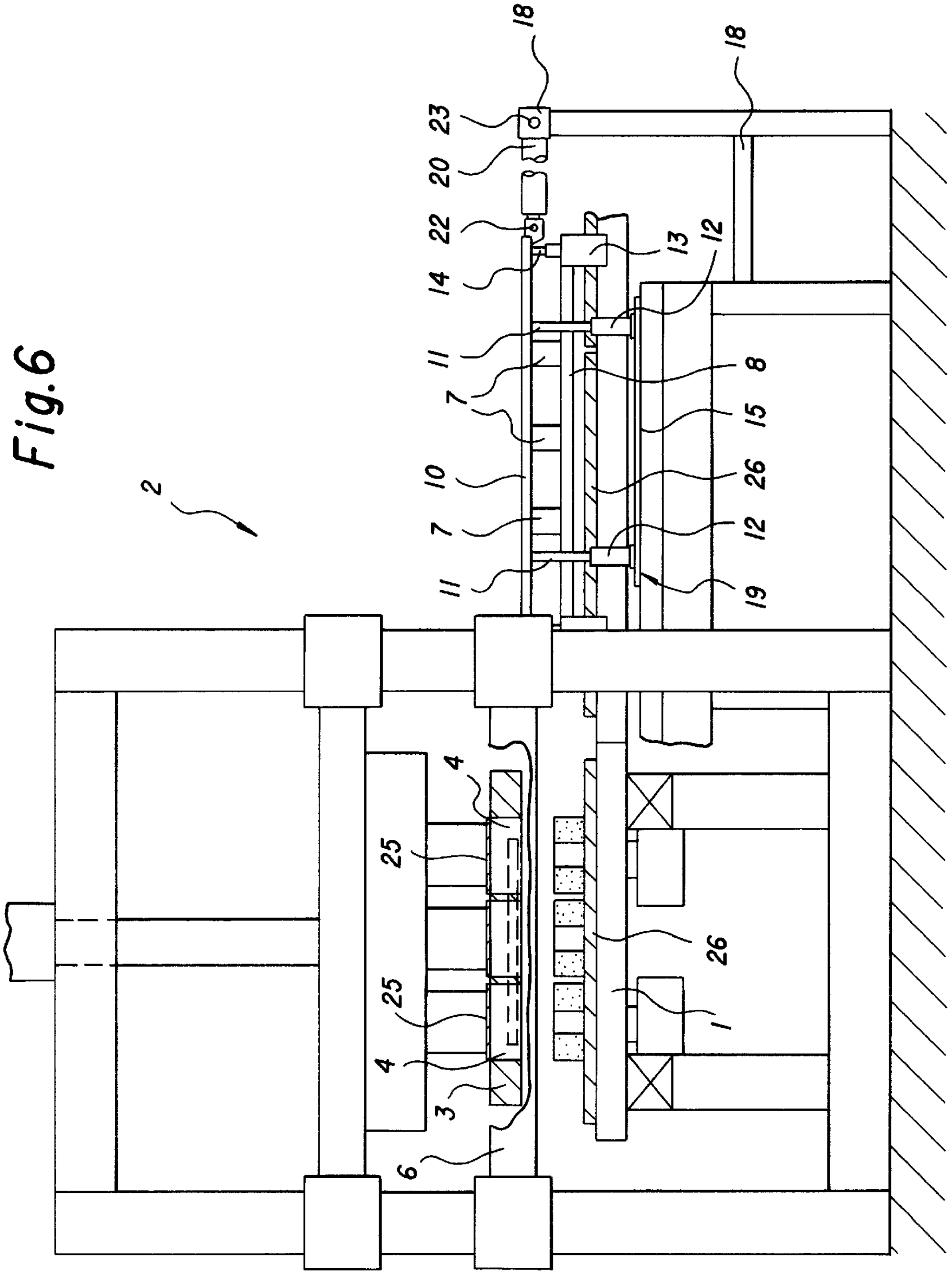
FIG. 6 is a side elevational view similar to that of FIG. 5 but showing a core-holder unit moved out horizontally from the area of the mold.
Figure 7:
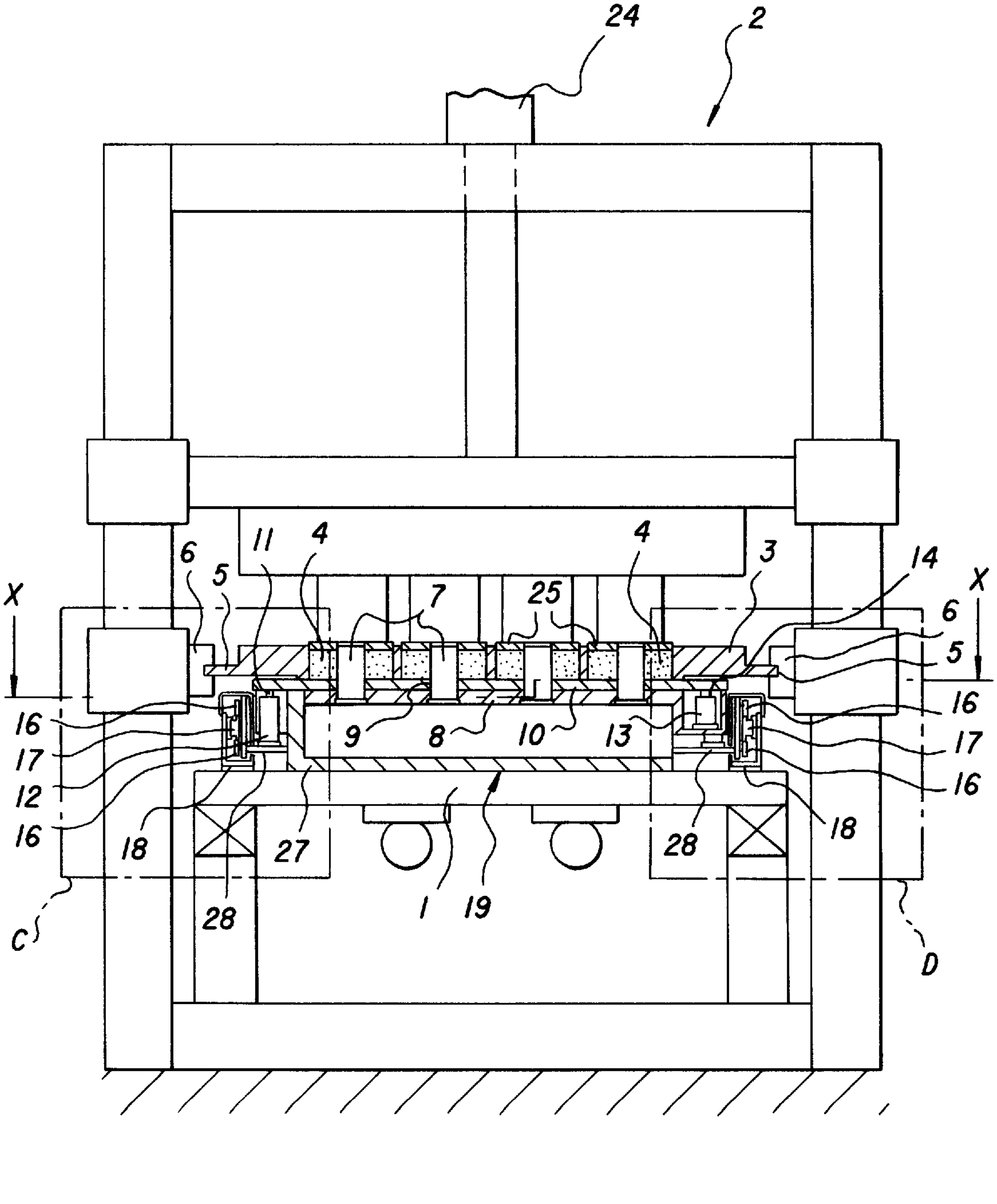
FIG. 7 is a front elevational view similar to that of FIG. 1 but showing a modification of the molding machine and partially cut away to show the mold cores extending into the mold recesses.

Then, unit 19, which consists of wiping plate 10, core support plate 8, piston-cylinder units 12, and stepped cylinders 13, is moved out in the horizontal direction from the area of mold 3 by actuating hydraulic cylinder 20 (FIG. 6). At the same time, a storage board 26 is run in under core support plate 8 on vibrating table 1 (FIG. 6). Then, mold 3 is moved downward from supports 6 together with pressure plates 25 and placed on storage board 26. Mold 3 is then run upward relative to pressure plates 25, so that the finished shaped bricks, which now have recesses that correspond to mold cores 7, are ejected from mold cavities 4. Further horizontal movement of storage board 26 transports the shaped bricks away. To start a new cycle, unit 19 is again run into its starting position and placed on vibrating table 1 together with mold 3. In this case, pressure plates 25 remain in their upper position, not shown, so that mold cavities 4 can be filled in a known way.

A modification of the invention is shown in FIGS. 7 to 13. In this modification, core support plate 8 is placed in a box 27, which is placed on vibrating table 1 and is covered on its top side by wiping plate 10 and can be screwed in a detachable manner to the box. Piston rods 11 of piston-cylinder units 12, which are connected to one another by one transverse support 28 each (left side of FIG. 7), are attached to the transverse sides of wiping plate 10, which rises laterally above box 27. As in the embodiment according to FIG. 1, rollers 16 are arranged on transverse supports 28, which run on rails 17 of frame 18. It can be seen from FIG. 7 that frame 18 runs laterally over vibrating table 1.

Figure 8:
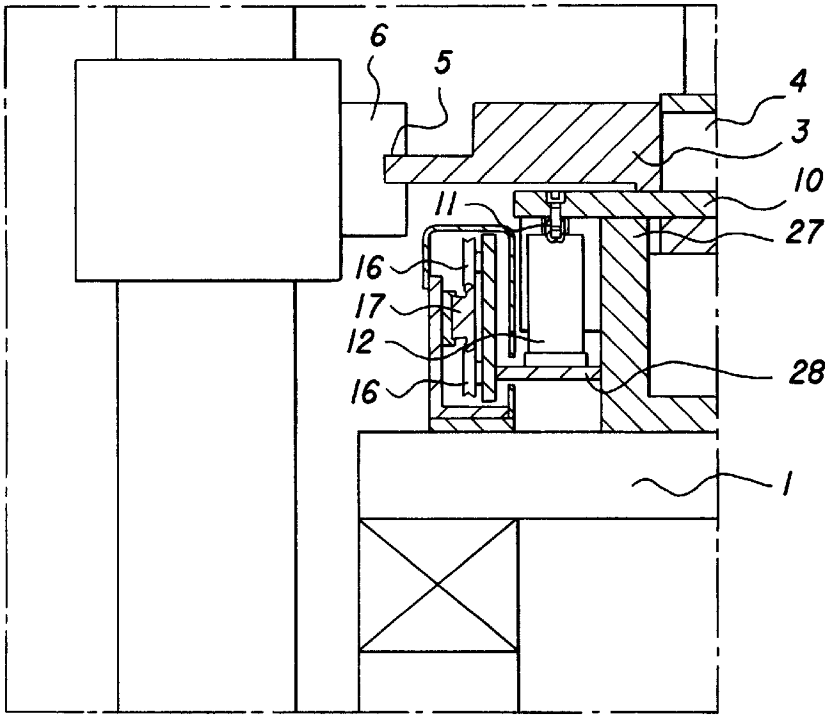
FIG. 8 is an enlarged view of detail C in FIG. 7.
Figure 9:
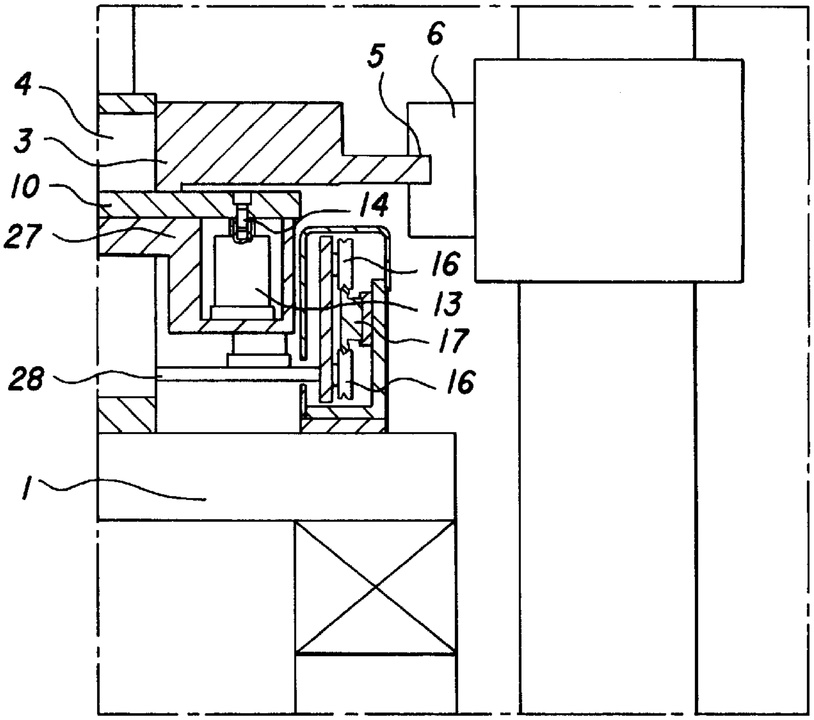
FIG. 9 is an enlarged view of detail D in FIG. 7.
Figure 10:
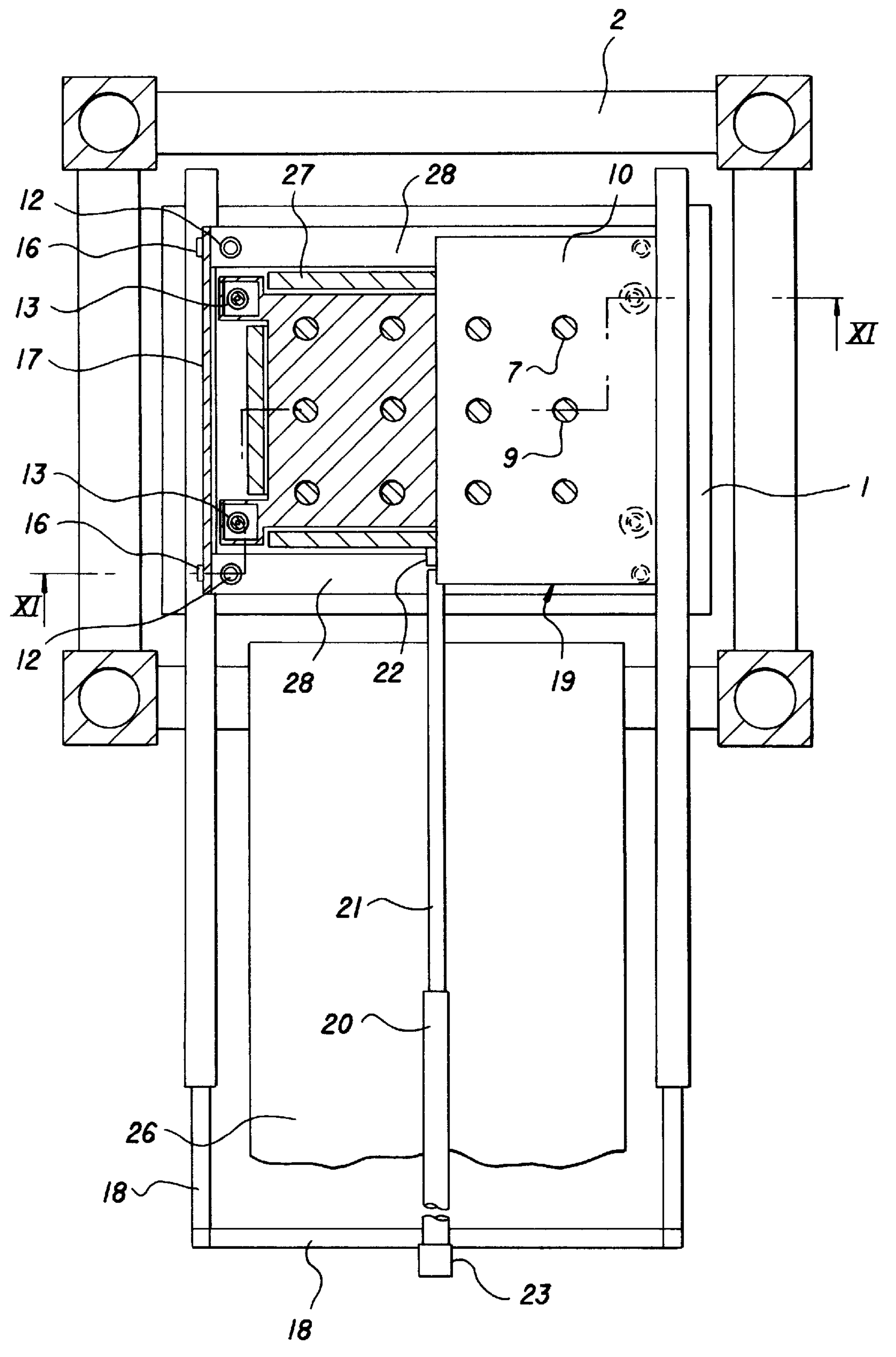
FIG. 10 is a sectional view taken along the lines X—X in FIG. 7.

Core support plate 8 with mold cores 7, which penetrate wiping plate 10 and project into mold cavities 4 of mold 3, is placed in box 27. On the outer sides of core support plate 8 are arranged stepped cylinders 13, whose piston rods 14 are attached to wiping plate 10 (right side of FIG. 7). In FIGS. 8 and 9, the arrangement of piston-cylinder units 12 and stepped cylinders 13 is depicted in enlarged form as details C and D of FIG. 7.

Figure 11:
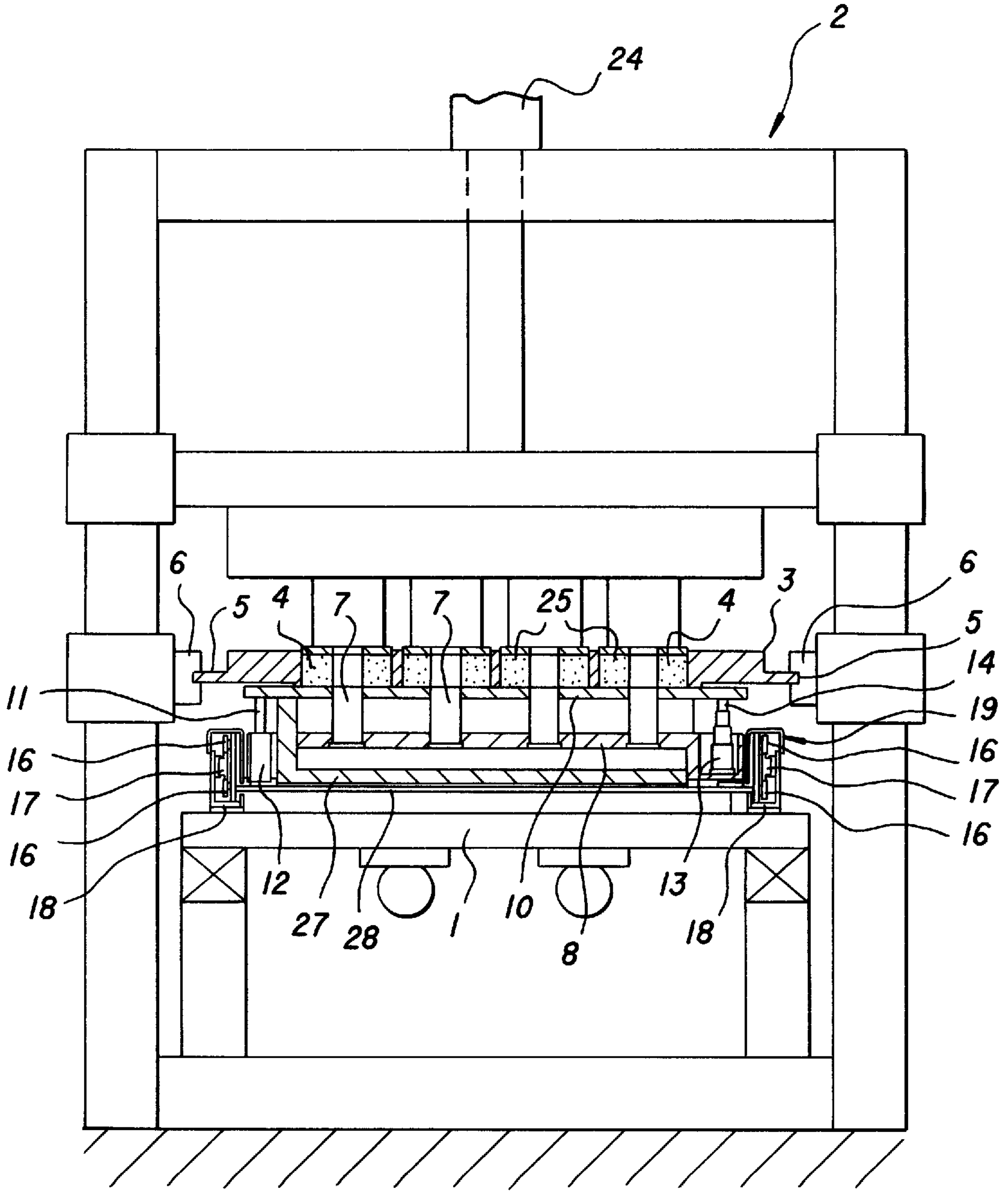
FIG. 11 is a view similar to that of FIG. 7 but showing a modification wherein the mold cores are moved downwardly with respect to the mold.
Figure 12:
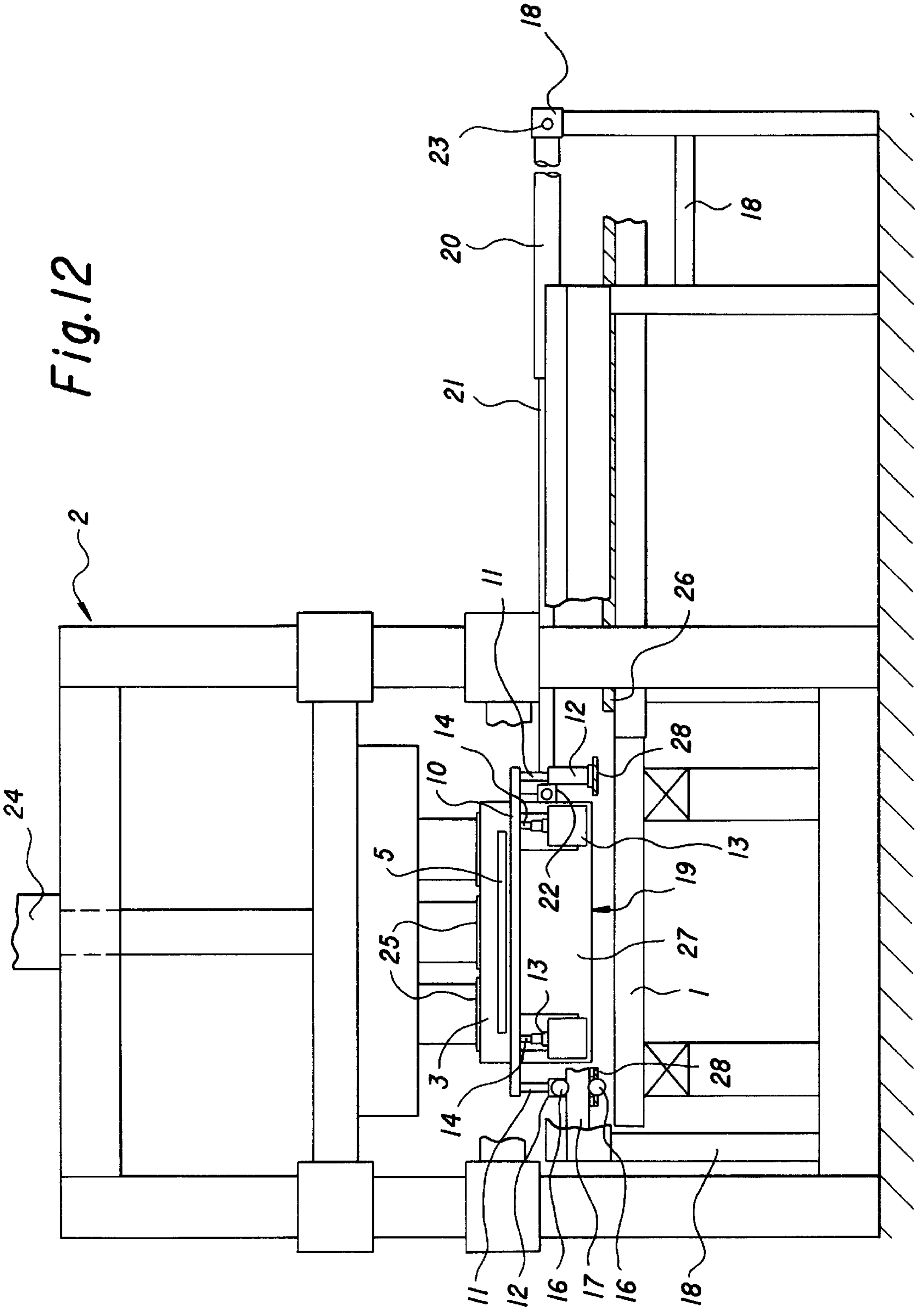
FIG. 12 is a side elevational view of the modifications shown in FIG. 7.
Figure 13:
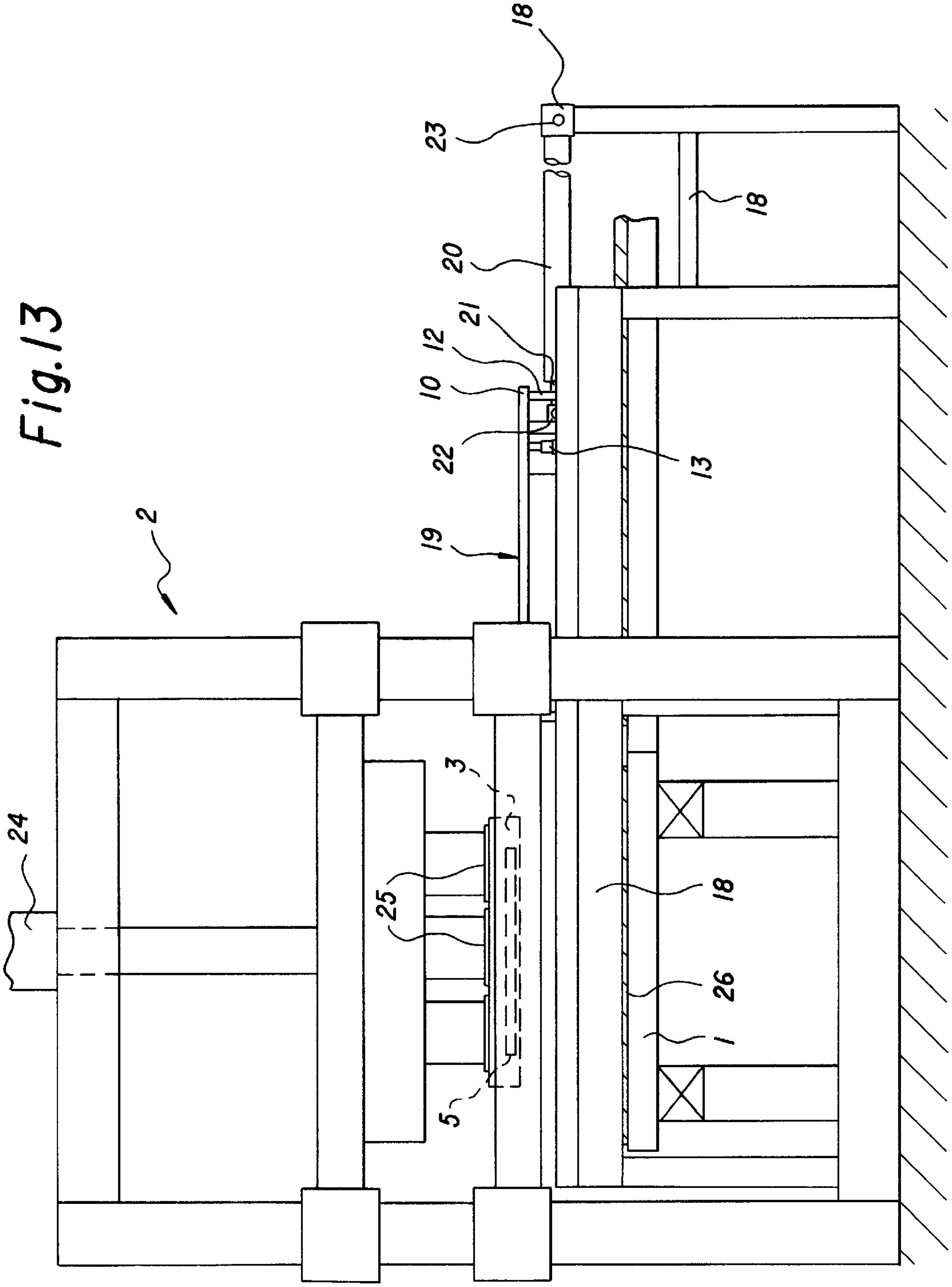
FIG. 13 is a view similar to that of FIG. 12 and showing the core-holder unit moved outwardly from the area of the mold.
Figure 14:
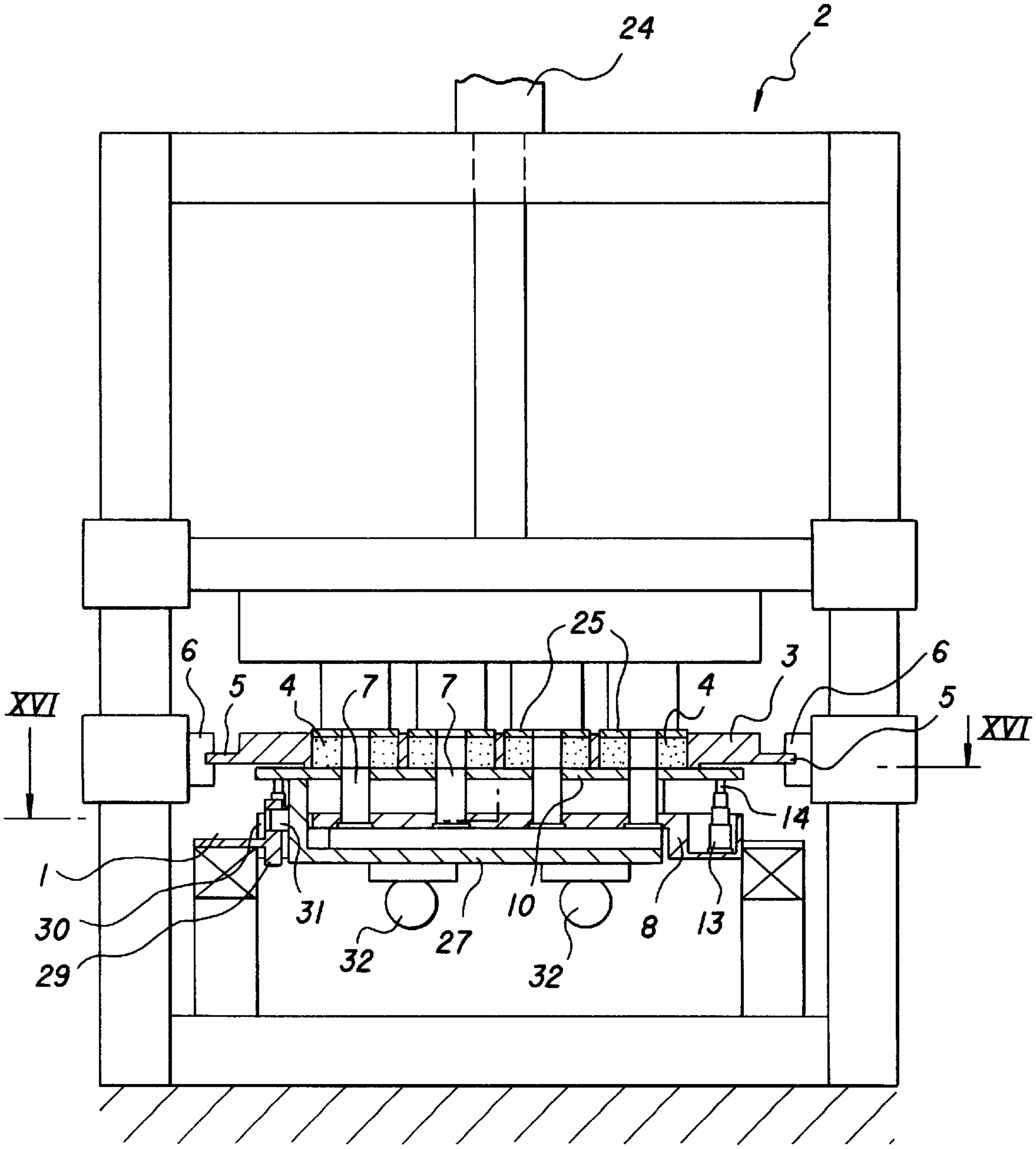
FIG. 14 is a front elevational view of still another modification of the molding machine of the present invention and partially cut away to show mold cores that are moved downwardly with respect to the molds.

The operation is distinguished from that of the embodiment according to FIGS. 1 to 6 in that the demolding of mold cores 7 is accomplished not by the movement of mold 3 upward, but in a kinematically opposite manner by the movement of core support plate 8 downward relative to mold 3 and to wiping plate 10. For this purpose, first wiping plate 10 together with box 27, mold 3 and pressure plates 25 is moved upward by the actuation of piston-cylinder units 12, and then core support plate 8 is moved downward by actuation of stepped cylinders 13 until the upper edge of mold cores 7 lies on the same plane as the upper edge of wiping plate 10 (FIG. 11 and 12). Then, unit 19, which consists of wiping plate 10, box 27, core support plate 8, piston-cylinder units 12 and stepped cylinders 13, is run out in the horizontal direction from the area of mold 3 by actuating hydraulic cylinder 20 in the same way as in the first embodiment (FIG. 13).

Figure 15:
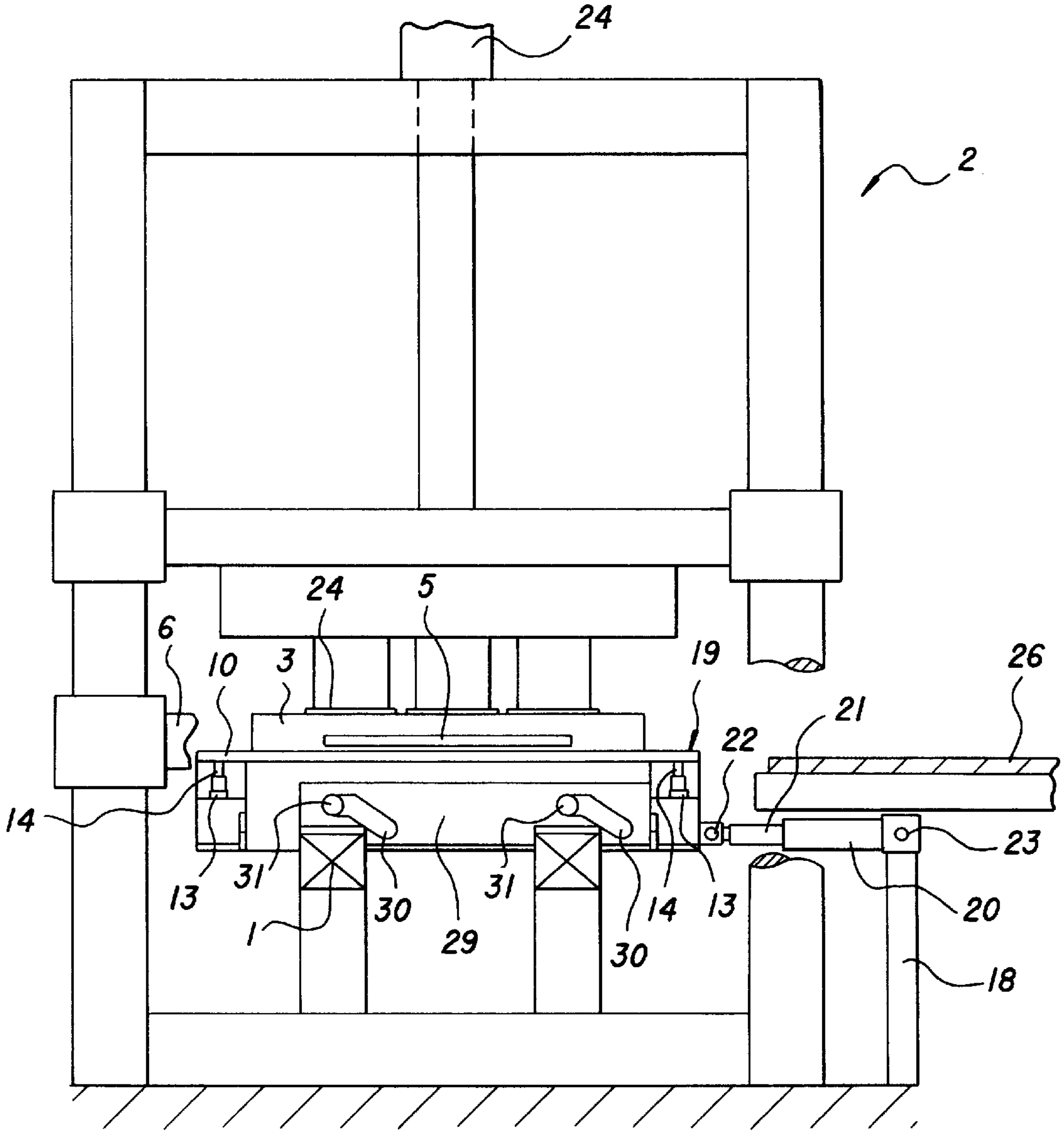
FIG. 15 is a side elevational view of the molding machine shown in FIG. 14.
Figure 16:
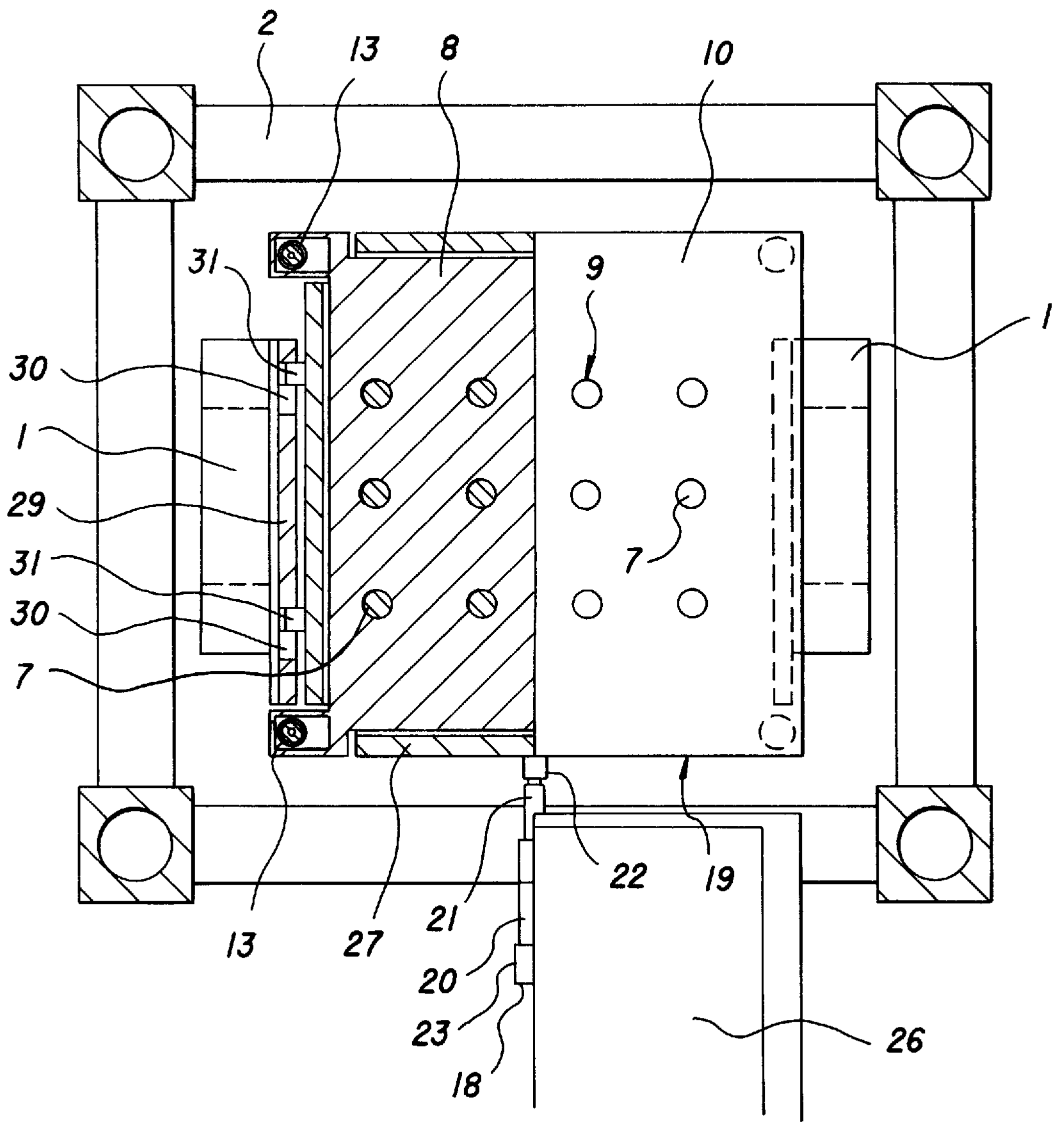
FIG. 16 is a sectional view taken along the line XVI—XVI in FIG. 14.

Another modification of the invention is shown in FIGS. 14 to 17. Vibrating table 1 is split and has two horizontally extending cheeks 29, between which box 27 with core support plate 8, wiping plate 10, and stepped cylinders 13 is placed. Guideways 30 to allow the sliding of guide pins 31, which are attached to the longitudinal sides of box 27, are located in cheeks 29. Guideways 30, two of which are arranged in each cheek 29 respectively, run first horizontally and then obliquely downward in an approximately vertical direction (FIG. 15). Hydraulic cylinder 20, which is hinged with its piston rod 21 via hinge 22 to box 27 and via hinge 23 to frame 18, is used to move box 27 in guideways 30. In this design, vibrating devices 32 are screwed directly to box 27, which thus assumes the partial function of vibrating and compressing the shaped bricks.

Figure 17:
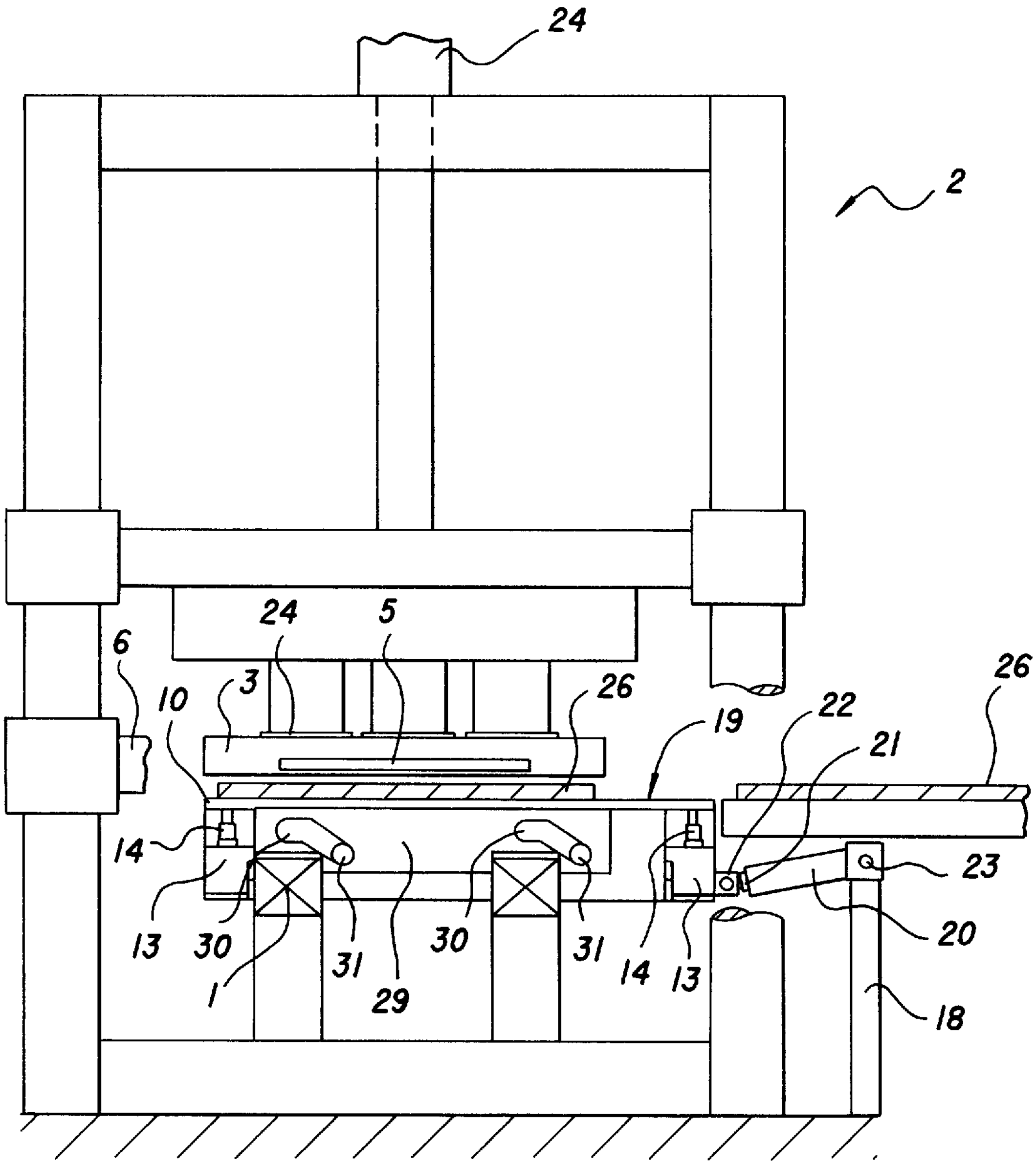
FIG. 17 is a side elevational view similar to that of FIG. 15 but showing the core-holder unit in a lowered position.

After the vertical removal of mold cores 7, unit 19 that consists of wiping plate 10, core support plate 8, and stepped cylinders 13 is no longer run out horizontally from the area of mold 3, but rather is forced vertically downward in guideways 30 (FIG. 17). In this case, unit 19 is first moved a relatively short distance in the horizontal direction by actuation of hydraulic cylinder 20 to provide a smooth surface on the lower side of the shaped brick, along which the upper side of wiping plate 10 slides. Then, unit 19 moves obliquely downward in an approximately vertical direction, so that enough vertical distance between mold 3 and wiping plate 10 develops to run in board 26 and to position it directly under mold 3 (FIG. 17). Then, the finished shaped bricks are put down on board 26 as already described. In this way, the relatively long paths for running unit 19 in and out in the area of mold 3 are considerably shortened.

In other modifications of the invention, instead of cylindrical mold cores 7, mold cores with other geometrical shapes for producing various recesses in a shaped brick or on its outer sides can also be used to be able to produce, e.g., a paving brick according to DE-OS 43 17 442. The recesses may also penetrate only a portion of the shaped brick, or they may be attached in steps. By the process according to the invention, any number of recesses of any size and shape in the interior or on the outer sides of the shaped brick are possible.

Thus it can be seen that the present invention provides both an apparatus and process for forming of molded bricks which may have a wide variety of shapes and positions of recesses or holes within the brick and, further which bricks are provided with smooth surfaces, even on those areas of the bricks in which the recesses have been formed.

It will be understood that this invention is susceptible to modification in order to adapt it to different usages and conditions, and accordingly, it is desired to comprehend such modifications within this invention as may fall within the scope of the appended claims.

What is claimed is:

1. An apparatus for the production of shaped bricks from a mold having one or more cavities therein comprising a mold (3) having one or more cavities (4) therein supported on the apparatus, means (8) below said mold for supporting mold cores (7) corresponding to said mold cavities, a wiping plate (10) below said mold and above said mold core supporting means and having a plurality of openings therein through which said mold cores protrude, means for moving said mold upwardly, means for moving said wiping plate vertically upwardly with respect to said mold cores to a first plane defined by the ends of said cores, and means (20,21) for moving said wiping plate together with said mold supporting means horizontally from the area of the mold.

2. An apparatus as claimed in claim 1 wherein said means for moving said wiping plate comprises two laterally disposed piston-cylinder units (12), and a support member (15) interconnecting said piston-cylinder units.

3. An apparatus as claimed in claim 2 and further comprising a vibrating table (1) beneath said means for supporting the mold cores, said support member (15) having rollers (16) thereon, a frame (18) attached to said apparatus and disposed laterally with respect to said vibrating table, and a pair of rails (17) on said frame (18) supporting said rollers (16) thereon.

4. An apparatus as claimed in claim 1 and further comprising means connected to said core supporting means (8) for vertically lifting said supporting means.

5. An apparatus as claimed in claim 4 wherein said lifting means comprises a pair of stepped cylinders (13) disposed laterally of said core supporting means (8).

6. An apparatus as claimed in claim 4 and further comprising means for interconnecting said wiping plate (10), said core supporting means (8) and their respective lifting and moving means to define a unit (19) which is movable horizontally from the mold area.

7. An apparatus as claimed in claim 6 and further comprising a frame and a horizontally acting first hydraulic cylinder (20) mounted on said frame (18) and connected to said unit (19).

8. An apparatus as claimed in claim 7 and further comprising means for pivotally connecting said hydraulic cylinder (20) to said unit (19) and frame (18) and comprising horizontally extending pivot axes disposed transversely to the driving direction of said unit (19).

* * * * *